(12) United States Patent
Hwang et al.

(10) Patent No.: US 9,071,749 B2
(45) Date of Patent: Jun. 30, 2015

(54) CAMERA APPARATUS AND METHOD OF RECOGNIZING AN OBJECT BY USING A CAMERA

(75) Inventors: Jee-Na Hwang, Gyeonggi-do (KR); Pyo-Jae Kim, Seoul (KR); Jae-Sik Sohn, Gyeonggi-do (KR); Jin-Hee Na, Seoul (KR); Young-Kwon Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 118 days.

(21) Appl. No.: 13/529,688

(22) Filed: Jun. 21, 2012

(65) Prior Publication Data

US 2012/0327269 A1  Dec. 27, 2012

(30) Foreign Application Priority Data

Jun. 21, 2011 (KR) ........................ 10-2011-0060396

(51) Int. Cl.
*H04N 5/232* (2006.01)
*H04N 9/68* (2006.01)
*H04N 5/222* (2006.01)

(52) U.S. Cl.
CPC ................................ *H04N 5/23219* (2013.01)

(58) Field of Classification Search
CPC ..... H04N 9/045; H04N 9/07; H04N 5/23293; H04N 5/23296; H04N 5/235; H04N 5/2351
USPC .................... 348/234, 352, 333.11, 345, 347; 382/117, 118
See application file for complete search history.

(56) References Cited

U.S. PATENT DOCUMENTS

| | | | | |
|---|---|---|---|---|
| 7,526,100 | B1* | 4/2009 | Hartman et al. | 382/103 |
| 2009/0059007 | A1* | 3/2009 | Wagg et al. | 348/157 |
| 2009/0161913 | A1 | 6/2009 | Son | |
| 2009/0251557 | A1* | 10/2009 | Kim et al. | 348/222.1 |
| 2009/0257644 | A1* | 10/2009 | Dodzin et al. | 382/145 |
| 2010/0007746 | A1* | 1/2010 | Lee | 348/208.6 |
| 2010/0194963 | A1* | 8/2010 | Terashima | 348/333.11 |
| 2010/0208105 | A1* | 8/2010 | Kubota | 348/234 |
| 2011/0249139 | A1* | 10/2011 | Iwase et al. | 348/223.1 |
| 2011/0304765 | A1* | 12/2011 | Yogo et al. | 348/345 |
| 2011/0319131 | A1* | 12/2011 | An et al. | 455/556.1 |

FOREIGN PATENT DOCUMENTS

| | | |
|---|---|---|
| JP | 2007251258 | 9/2007 |
| KR | 1020100087832 | 8/2010 |
| KR | 1020100125983 | 12/2010 |

* cited by examiner

*Primary Examiner* — Sinh Tran
*Assistant Examiner* — Xi Wang
(74) *Attorney, Agent, or Firm* — The Farrell Law Firm, P.C.

(57) ABSTRACT

An apparatus and method of recognizing an object by using a camera includes detecting feature information from a first preview image; comparing the feature information with a threshold condition; changing a camera setting parameter, when the feature information does not satisfy the threshold condition; and performing an object recognition for a second preview image generated based on the changed camera setting parameter.

15 Claims, 11 Drawing Sheets

CAMERA APPARATUS AND METHOD OF RECOGNIZING AN OBJECT BY USING A CAMERA

PRIORITY

This application claims priority under 35 U.S.C. §119(a) to Korean Patent Application Serial No. 10-2011-0060396, which was filed in the Korean Industrial Property Office on Jun. 21, 2011, the entire content of which is incorporated herein by reference.

BACKGROUND OF THE INVENTION

1. Field of the Invention

The present invention relates generally to an apparatus and a method for recognizing an object in an image photographed by using a camera, and more particularly to an apparatus and a method for improving the accuracy of object recognition using the camera.

2. Description of the Related Art

In order to recognize and trace an object in a photographed image, a feature point (e.g., an edge or a corner) of the object is extracted and the extracted feature point is compared with a feature point extracted from a raw image DataBase (DB).

However, extraction of the feature point of the object often fails when edge information, an object edge point (or corner point), or a texture amount (i.e. feature point information) is insufficient because that input image is too dark, the camera is shaken, or the size of the object within the image is too small.

Additionally, a preview image of a conventional camera apparatus is insufficient for detecting feature points of an object because the preview image is focused on improving image quality. For example, when the luminance is constant, an ISO is determined to have the same value, regardless of a characteristic of an input image. However, a feature recognition, a trace, and a matching capability are greatly decreased when an image having insufficient textures is entered in comparison with an image having rich textures.

SUMMARY OF THE INVENTION

Accordingly, the present invention has been made to solve the above-described problems occurring in the prior art, and to provide at least the advantages described below.

An aspect of the present invention is to provide a method for improving an object recognition and a trace capability from an input image by using a camera setting parameter.

Another aspect of the present is to improve the object recognition and the trace capability by providing an optimal setting for the recognition and the trace through the proposed setting parameter and control scheme to sufficiently secure the feature information of the object.

In accordance with an aspect of the present invention, a method of recognizing an object by using a camera is provided. The method includes detecting feature information from a first preview image; comparing the feature information with a threshold condition; changing a camera setting parameter, when the feature information does not satisfy the threshold condition; and performing an object recognition for a second preview image generated based on the changed camera setting parameter.

In accordance with another aspect of the present invention, a camera apparatus for recognizing an object is provided. The camera apparatus includes an imaging controller for changing a camera setting parameter; an image recognition processor for performing an object recognition for a first preview image and detecting feature information from the first preview image; and a camera setting parameter controller for comparing the feature information with a threshold condition, and controlling the imaging controller to change the camera setting parameter when the feature information does not satisfy the threshold condition.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will be described in detail below with reference to the accompanying drawings. Although detailed specific matters are discussed in the following description, the specific matters are only for general understanding and it is apparent to those skilled in the art that various changes and modifications can be made thereto within the technical spirit and scope of the present invention. Further, detailed descriptions of well-known functions and constructions are omitted to avoid unnecessarily obscuring the subject manner of the present invention.

Hereinafter, "feature information" refers to extractable information for recognizing an object within an image, i.e., information relating to a feature by which the object can be identified. For example, the feature information may mean the number of feature points, an intensity of the feature points, an amount of textures, etc., and the feature points may be an edge or a corner.

Figure 1:
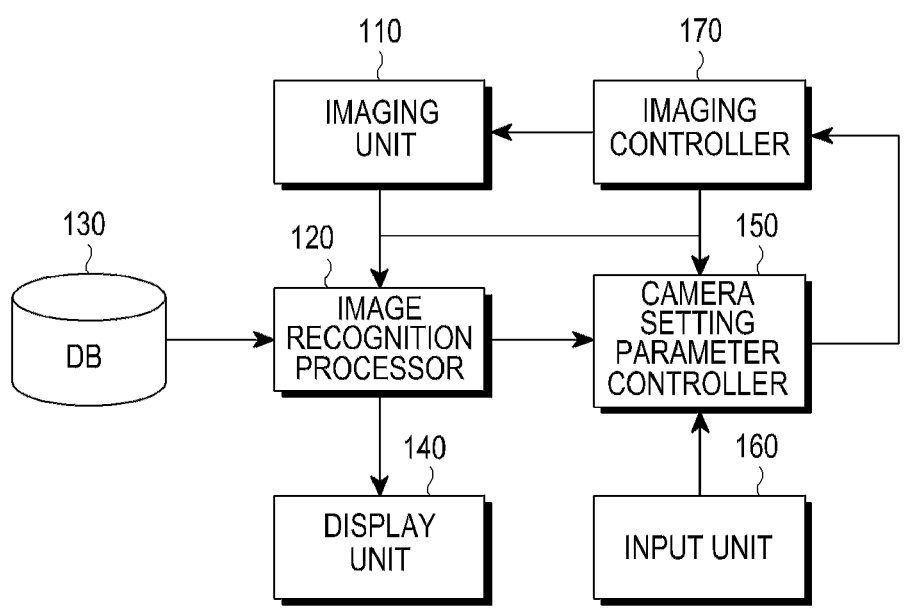
FIG. 1 is a block diagram illustrating a camera apparatus according to an embodiment of the present invention.

FIG. 1 is a block diagram illustrating a camera apparatus according to an embodiment of the present invention.

Referring to FIG. 1, the camera apparatus, e.g., a mobile terminal having a camera (or a camera module), includes an imaging unit 110, an image recognition processor 120, a memory 130, a display unit 140, a camera setting parameter controller 150, an input unit 160, and an imaging controller 170. The imaging unit 110 forms an optical image of a subject and detects the formed optical image as digital image data (i.e., raw image data). Although not illustrated in FIG. 1, the imaging unit 110 may include a lens system for forming an optical image of a subject and an image sensor such as a Complementary Metal-Oxide Semiconductor (CMOS) image sensor or a Charge-Coupled Device (CCD) image sensor for detecting the optical image formed by the lens system as digital image data.

The imaging unit 110 controls ISO, focusing, and exposure time according to a control signal of the imaging controller 170.

Although not illustrated in FIG. 1, the imaging unit 110 includes a general Image Signal Processor (ISP) and generates preview image data from the raw image data according to a preset preview setting parameter (resolution, noise filtering, and edge enhance). The raw image data refers to image data having full resolution supported by the image sensor, which has not been post processed (filtered). The preview image data refers to image data having lower resolution than the raw image data, after having gone through the post processing. Further, each of the raw image data and the preview image data includes consecutive image frames.

The image recognition processor 120 recognizes an object (i.e., a photograph subject) from the preview image data received from the imaging unit 110, or estimates or traces a movement of the object. Further, the image recognition processor 120 outputs an object recognition result for the preview image to the camera setting parameter controller 150.

The display unit 140 displays the preview image data received from the image recognition processor 120. Alternatively, the display unit 140 may directly receive the preview image data from the imaging unit 110 to display the received preview image data without going through the image recognition processor 120. For example, a Liquid Crystal Display (LCD) or a touch screen may be used as the display unit 140.

The input unit 160 may be a touch panel and/or a key pad including control buttons. The input unit 160 provides user input information to the camera setting parameter controller 150.

The imaging controller 170 controls ISO, focusing, and exposure time of the imaging unit 110, according to a control signal input from the camera setting parameter controller 150. Further, the imaging controller 170 can output the camera setting parameter of the imaging unit 110 to the camera setting parameter controller 150.

The memory 130 stores images for providing applications having various functions and Graphical User Interfaces (GUIs) associated with the applications, user information, databases related to documents, background images (a menu screen and a standby screen) required for driving the camera system, operating programs, etc. Further, the memory 130 stores reference image data, such as a face of a user, and feature information of the reference image data. The memory 130 may be shared by the imaging unit 110, the imaging controller 170, and the camera setting parameter controller 150, although any of the imaging unit 110, the imaging controller 170, and the camera setting parameter controller 150 may include a separate memory.

Figure 2:
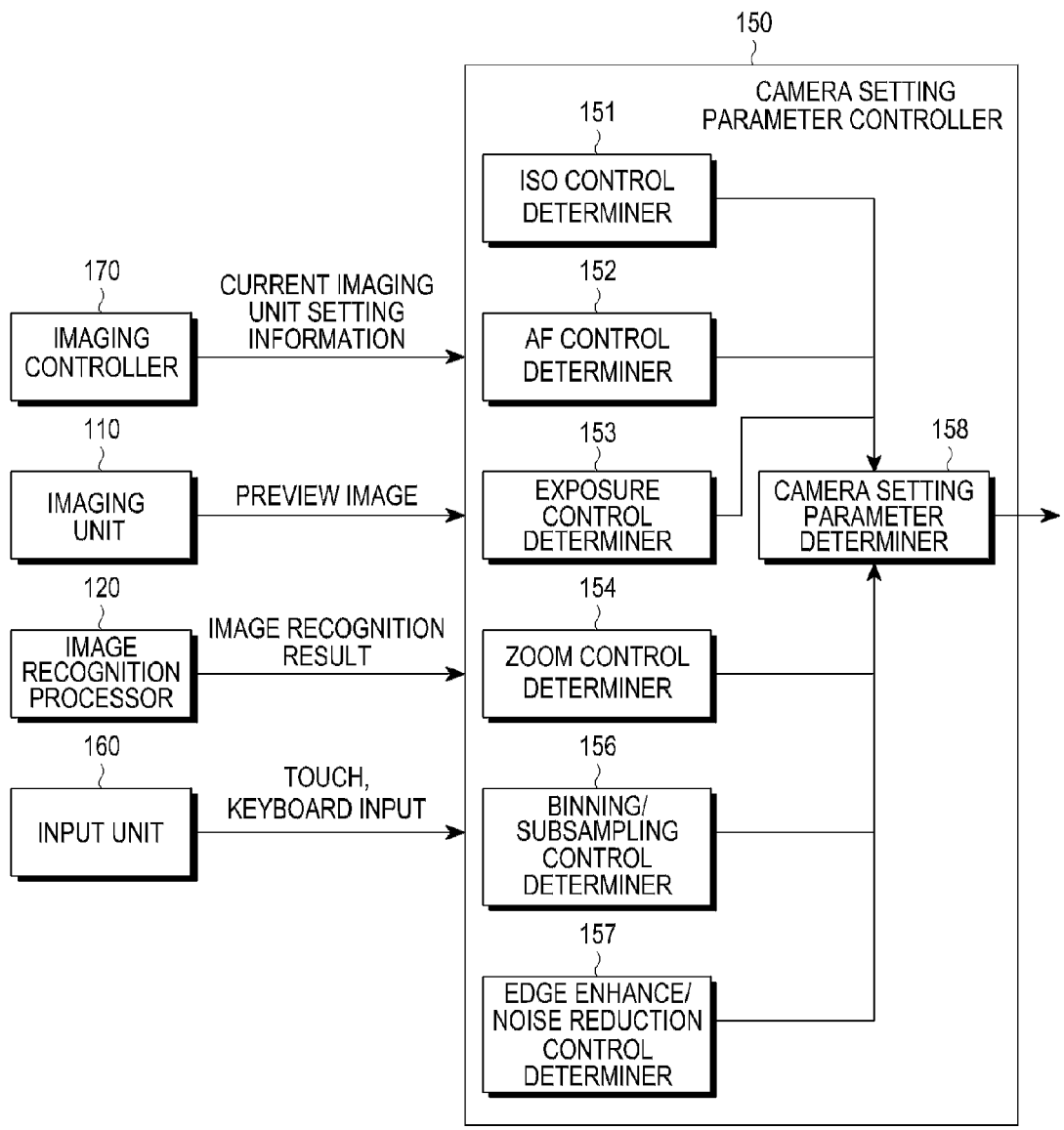
FIG. 2 is a block diagram illustrating a camera setting parameter controller according to an embodiment of the present invention.

FIG. 2 is a block diagram illustrating a camera setting parameter controller according to an embodiment of the present invention.

Referring to FIG. 2, the camera setting parameter controller 150 includes an ISO control determiner 151, an Auto Focus (AF) control determiner 152, an exposure control determiner 153, a zoom control determiner 154, a binning/subsampling control determiner 156, an edge enhance/noise reduction control determiner 157, and a camera setting parameter determiner 158. The camera setting parameter controller 150 receives at least one of a current camera setting parameter from the imaging controller 170, preview image data from the imaging unit 110, an image recognition result from the image recognition processor 120, and user input information from the input unit 160. The camera setting parameter controller 150 implements at least one of an ISO, an AF, an exposure, a zoom, a binning/subsampling, and an edge enhance/noise reduction.

The camera setting parameter determiner 158 selects at least one of the camera setting parameters, and changes the selected camera setting parameter. For example, when the image recognition result by the image recognition processor 120 is dissatisfactory, i.e., when feature information included in the image recognition result does not meet a preset threshold condition (e.g., defined by the number, intensity, an amount, etc.) or the number of and an intensity of feature points does not meet a preset threshold value, the camera setting parameter determiner 158 selects at least one camera setting parameter to be changed based on a preset selection order of the camera setting parameters or the recognition result. Further, the camera setting parameter determiner 158 outputs the changed camera setting parameter to the imaging controller 170, which changes a setting of the imaging unit 110 according to the changed camera setting parameter.

Figure 3:
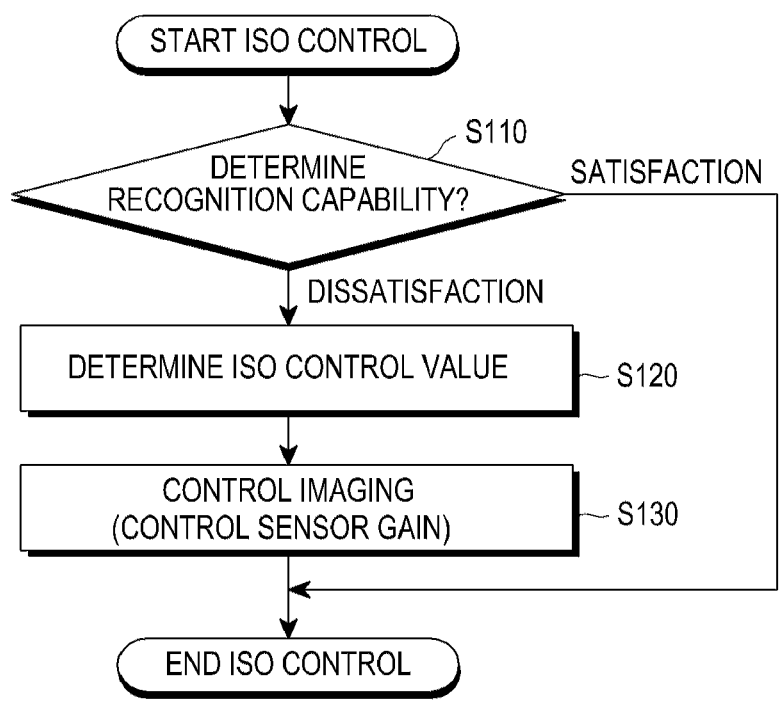
FIG. 3 is a flowchart illustrating an ISO control process according to an embodiment of the present invention.
Figures 4A, 4B:
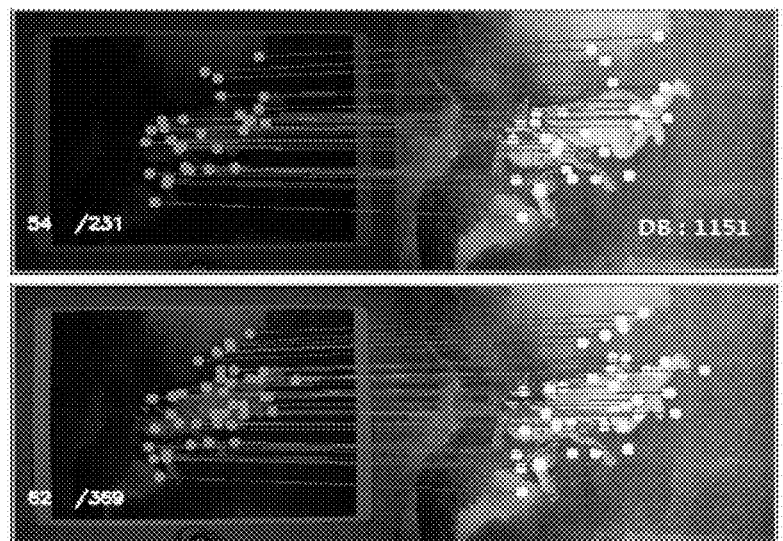
FIGS. 4A and 4B illustrate an object recognition result according to an ISO change according to an embodiment of the present invention.

FIG. 3 is a flowchart illustrating an ISO control process according to an embodiment of the present invention, and FIGS. 4A and 4B illustrate an object recognition result according to an ISO change according to an embodiment of the present invention.

The ISO control process illustrated in FIG. 3 analyzes a capability recognizing an object within a preview image under a low luminance environment to increase a gain of the image sensor until the gain of the image sensor reaches a desired reference, which improves a capability of a recognition algorithm.

Referring to FIG. 3, the ISO control determiner 151 determines an object recognition capability in step S110, and when the recognition capability is unsatisfactory, determines an ISO control value in step S120, and controls imaging in step S130. When the recognition capability is satisfactory, the ISO control process is ended.

Specifically, in step S110, the ISO control determiner 151 determines a capability of the recognition result received from the image recognition processor 120, i.e., whether the recognition result is satisfactory or dissatisfactory. The ISO control determiner 151 determines the capability of the recognition result based on feature information (e.g., the number of feature points, an edge intensity, and the number of matched feature points) identified through the recognition result. The "matched feature points" refer to feature points, among recognized feature points, corresponding to pre-stored feature points of reference image data, and the "edge intensity" refers to a contrast status of the edge, i.e., a brightness difference in a horizontal direction of the edge, a brightness difference in a vertical direction of the edge, or an average therebetween. Alternatively, the ISO control determiner 151 can directly receive information on whether the recognition capability is satisfactory from the image recognition processor 120.

In step S120, the ISO control determiner 151 determines the ISO control value (e.g., a gain of the image sensor) based on the recognition result.

More specifically, FIG. 4A illustrates 54 feature points and 231 matched feature points, where the ISO value is 500, and FIG. 4B illustrates 62 feature points and 369 matched feature points, where the ISO value is 800. Here, the number of feature points included in the reference image data stored in the memory 130 is 1151.

For example, the ISO control determiner 151 can determine the ISO value, which is one of the camera setting parameters, to be 800. That is, the ISO control determiner 151 compares at least one of the number of feature points, the edge intensity, and the number of matched feature points identified through the recognition result with a corresponding threshold value to calculate a desired ISO value.

In step S130, the ISO control determiner 151 transmits the determined ISO control value to the camera setting parameter determiner 158, which transmits the received ISO control value to the imaging controller 170.

Although is the example above describes the ISO control process being terminated after step S130, steps S110 to S130 may be repeated until the recognition result received from the image recognition processor 120 is satisfactory. In this case, an ISO control value at each repetitive step may be increased by a certain amount from the current ISO value.

In an environment of low luminance, i.e., an environment where a total brightness of the preview image data is dark, the ISO control process may be effectively applied, so that the camera setting parameter determiner 158 can perform the ISO control process when the total brightness of the preview image data is lower than a preset brightness.

Figure 5:
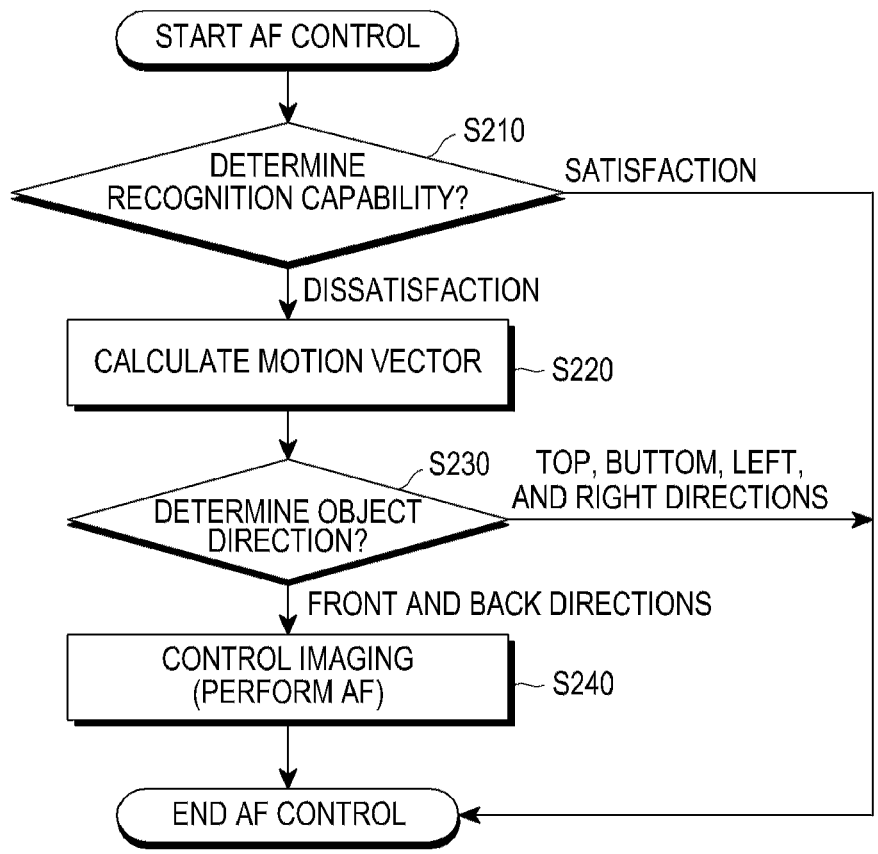
FIG. 5 is a flowchart illustrating an Auto Focus (AF) control process according to an embodiment of the present invention.

FIG. 5 is a flowchart illustrating an AF control process according to an embodiment of the present invention.

For an AF control process in a conventional camera, a contrast of an object within an image is calculated and the camera is focused using the calculated contrast. However, the AF control process illustrated in FIG. 5 proposes a method of determining whether a focus is performed by using motion vector direction information of the object with conventional contrast information in operating an AF or a continuous AF for an image-based recognition service.

Specifically, the AF control determiner 152 determines an object recognition capability in step S210, and when the recognition capability is unsatisfactory, calculates a motion vector in step S220 and determines an object direction in step S230. When the object has moved in a front or back direction of a focus plane of a previous image frame, the AF control determiner 152 controls imaging, i.e., performs AF, in step S240. The AF control process is terminated, when the recognition result is satisfactory in step S210 or when the object has moved in a top, bottom, left, or right direction on a focus plane of a previous image frame in step S230.

More specifically, in step S210, the AF control determiner 152 determines a capability of the recognition result received from the image recognition processor 120, i.e., whether the recognition result is satisfactory or dissatisfactory. As described above, the AF control determiner 152 determines the capability of the recognition result based on feature information identified through the recognition result. Alternatively, the AF control determiner 152 can directly receive information on whether or not the recognition is satisfactory from the image recognition processor 120.

In step S220, the AF control determiner 152 compares a current image frame with a previous image frame, and determines how an object of the previous image frame has moved in the current image frame. A degree of the movement is represented by a motion vector. Because a method of estimating movement is already known, a detailed description of the method is omitted herein.

In step S230, the AF control determiner 152 determines whether the calculated movement direction of the object is a transverse direction or a longitudinal direction. That is, the AF control determiner 152 determines whether the object has moved in a top, bottom, left, or right direction on a focus plane of the previous image frame, or the object has moved in a front or back direction of the focus plane of the previous image frame. That is, when a size of the object of the current image frame is identical to a size of the object of the previous image frame, the object has moved in a transverse direction. When the size of the object of the current image frame is larger or smaller than the size of the object of the previous image frame, the object has moved in a longitudinal direction.

In step S240, the AF control determiner 152 determines to perform an AF and transmits a performance command to the camera setting parameter determiner 158. The camera setting parameter determiner 158 transmits the received performance command for the AF to the imaging controller 170. The transmission of the performance command of the AF may correspond to setting an on/off flag of the AF indicating activation/deactivation of an AF function to an on status.

Although FIG. 5 illustrates that the AF control process is terminated after step S240, steps S210 to 240 may be repeated until the recognition result received from the image recognition processor 120 is satisfactory.

Figure 6:
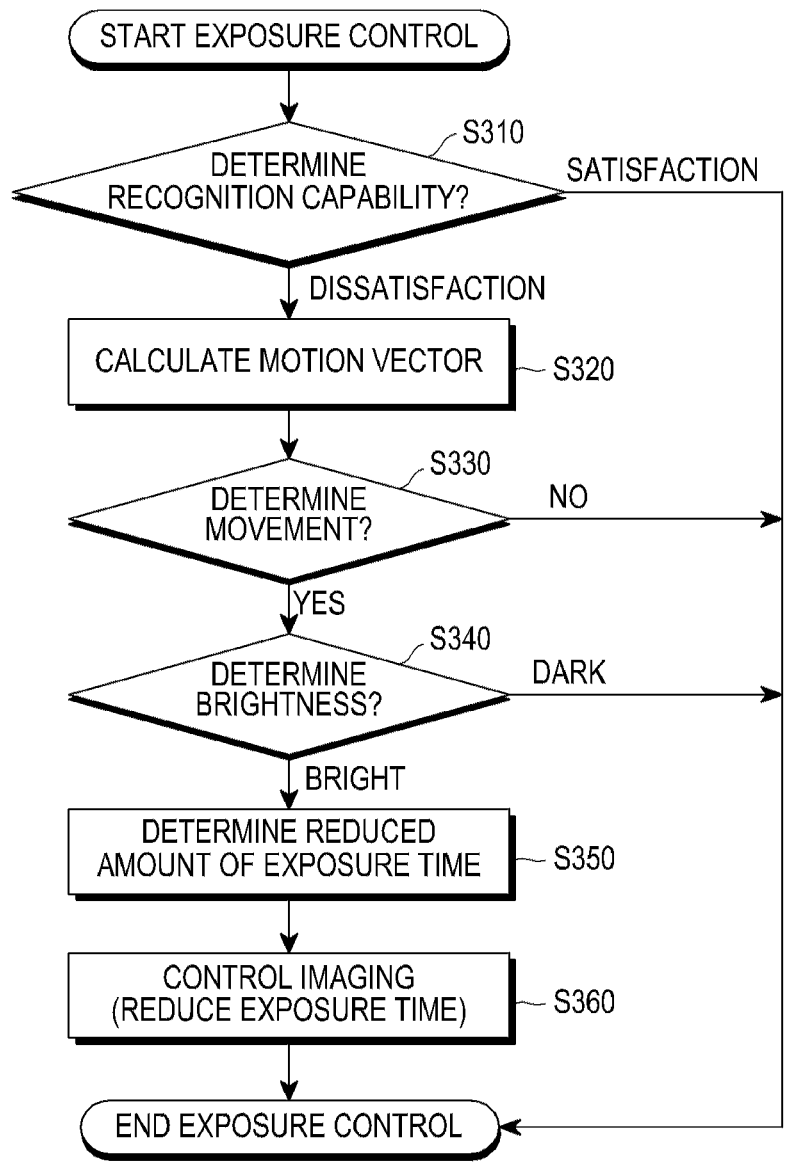
FIG. 6 is a flowchart illustrating an exposure control process according to an embodiment of the present invention.

FIG. 6 is a flowchart illustrating an exposure control process according to an embodiment of the present invention, and FIG. 7 illustrates an object recognition result according to an exposure time change according to an embodiment of the present invention.

Specifically, the exposure control process illustrated in FIG. 6 reduces an exposure time to minimize blur by using motion vector information obtained from feature points of an object within a preview image, when a movement of the object is large. Herein, the image should still have a sufficient brightness.

Specifically, the exposure control determiner 153 determines an object recognition capability in step S310, and when the recognition capability is unsatisfactory, calculates a motion vector in step S320, and determines a movement in step S330. When exposure control determiner 153 determines that the object has moved, the exposure control determiner 153 determines a brightness in step S340. When the exposure control determiner 153 determines that the brightness of the image frame is larger than the threshold value, the exposure control determiner 153 determines a reduced amount of an exposure time in step S350, and controls imaging (reduces exposure time) in step S360. The exposure control process is terminated, when the recognition result is satisfactory in step S310, when no movement is determined in step S330, or when the exposure control determiner 153 determines that the brightness of the image frame is not larger than the threshold value in step S340.

More specifically, in step S310, the exposure control determiner 153 determines a capability of the recognition result received from the image recognition processor 120, i.e., whether the recognition result is satisfactory or dissatisfactory. As described above, the exposure control determiner 153 determines the capability of the recognition result based on feature information identified through the recognition result or can directly receive information on whether or not the recognition is satisfactory from the image recognition processor 120.

In step S320, the exposure control determiner 153 compares a current image frame with a previous image frame, and determines whether an object of the previous image frame has moved in the current image frame. A degree of the movement is represented by a motion vector. Because a method of estimating movement is already known, a detailed description of the method is omitted herein.

In step S330, the exposure control determiner 153 determines whether the object has moved. That is, the exposure control determiner 153 compares a size of the calculated motion vector with a preset threshold value. When the size of the motion vector is larger than the threshold value, the exposure control determiner 153 determines that the object has moved. When the size of the motion vector is smaller than the threshold value, the exposure control determiner 153 determines that the object has not moved. Alternatively, the exposure control determiner 153 can compare (the size of the motion vector/a size of the preview image frame) with the preset threshold value.

In step S340, the exposure control determiner 153 compares a brightness of the current image frame with a preset threshold value. When the brightness of the image frame is larger than the threshold value, the exposure control determiner 153 determines that the brightness of the image frame is bright. When the brightness of the image frame is smaller than the threshold value, the exposure control determiner 513 determines that the brightness of the image frame is dark.

In step S350, the exposure control determiner 153 determines the reduced amount of the exposure time (i.e. frame rate (the number of frames per second)) based on whether an object has moved in the current image frame (or a size of the motion vector) and based on a brightness of the current image frame.

Figure 7A:
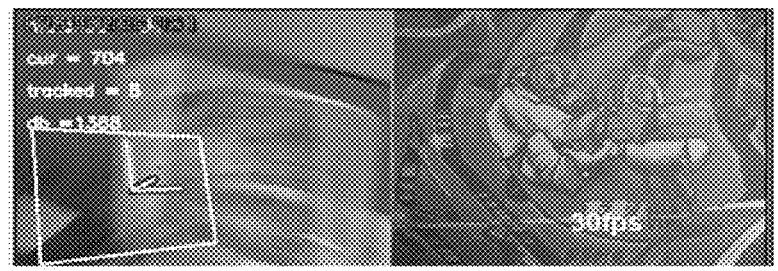
FIGS. 7A and 7B illustrate an object recognition result according to an exposure time change according to an embodiment of the present invention.
Figure 7B:
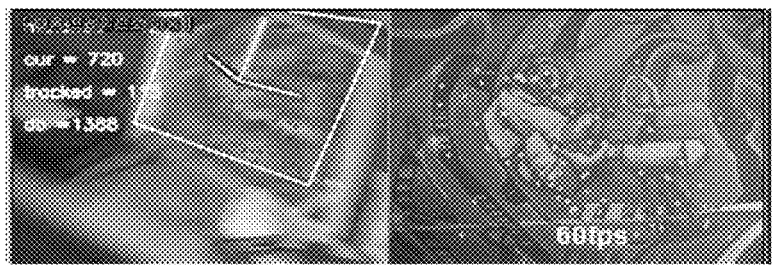

FIG. 7A illustrates 8 matched feature points, where a frame rate is 30 fps, and FIG. 7B illustrates 115 matched feature points, where the frame rate is 60 fps. Here, the number of feature points included in the reference image data stored in the memory 130 is 1388.

For example, the exposure control determiner 153 may determine the frame rate, which is one of the camera setting parameters, to be 60 fps. Specifically, the exposure control determiner 153 compares at least one of the number of feature points, the edge intensity, and the number of matched feature points identified through the recognition result with a corresponding threshold value to calculate a desired frame rate.

In step S360, the exposure control determiner 153 transmits the determined frame rate to the camera setting parameter determiner 158, and the camera setting parameter determiner 158 transmits the received frame rate to the imaging controller 170.

Although FIG. 6 illustrates that the exposure control process is terminated after step S360, steps S310 to S320 may be repeated until the recognition result received from the image recognition processor 120 is satisfactory. For example, a frame rate at each repetitive step may be increased by a certain amount from the current frame rate.

Figure 8:
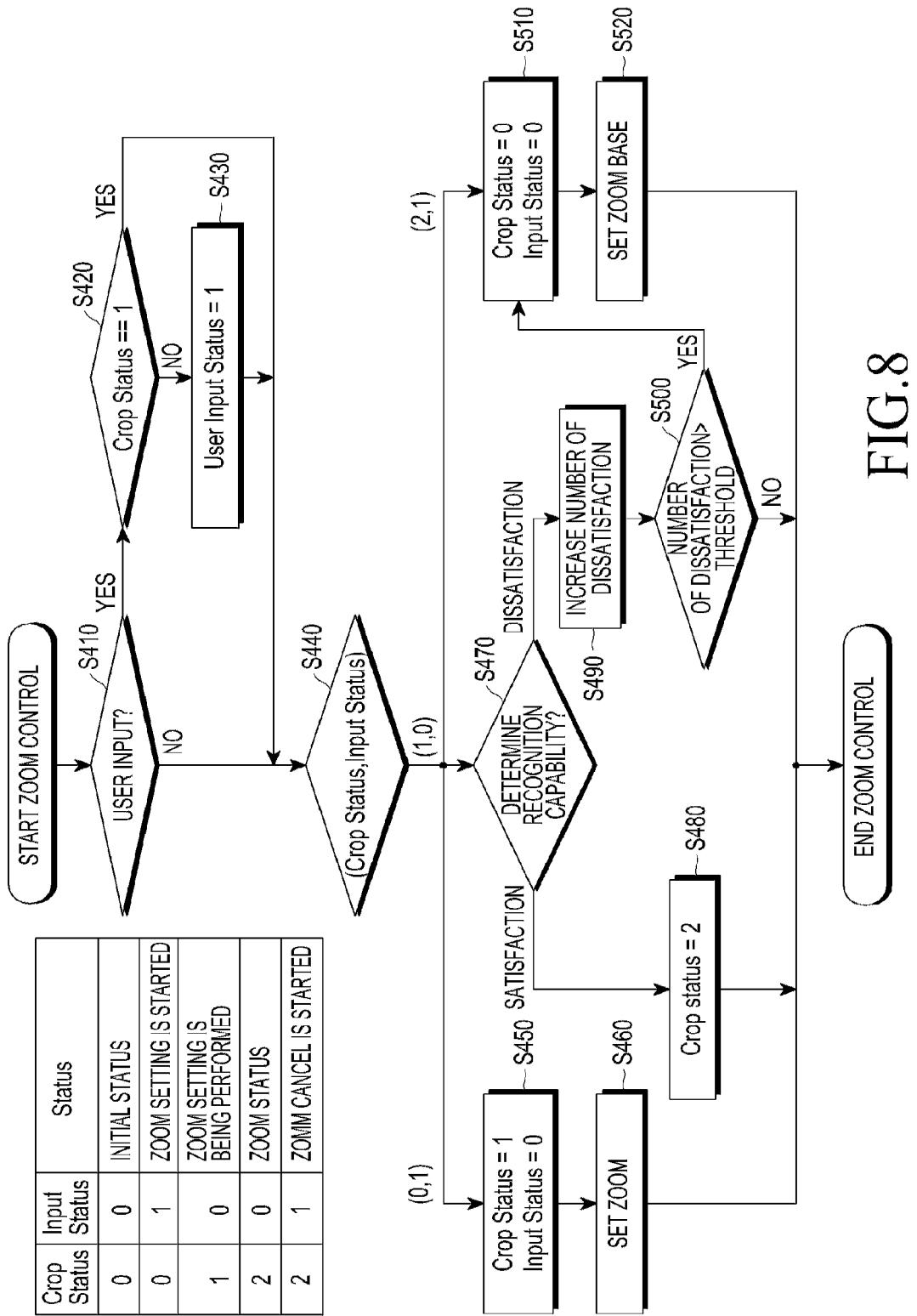
FIG. 8 is a flowchart illustrating a zoom control process according to an embodiment of the present invention.
Figure 9A:
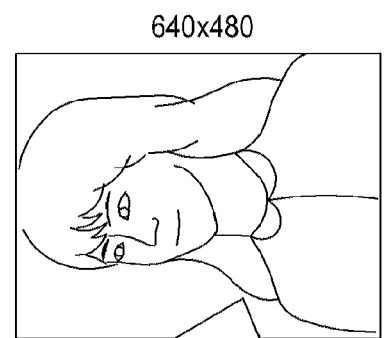
FIGS. 9A to 9C illustrate an object recognition result according to a zoom change according to an embodiment of the present invention.
Figure 9B:
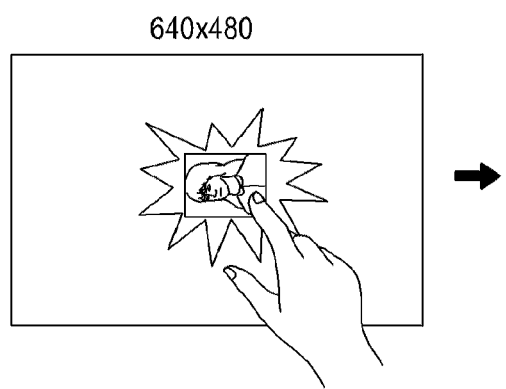
Figure 9C:
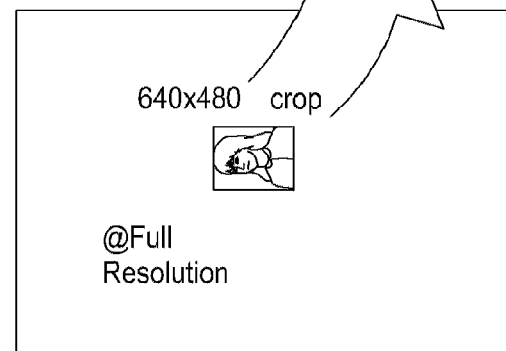

FIG. 8 is a flowchart illustrating a zoom control process according to an embodiment of the present invention, and FIGS. 9A to 9C illustrate an object recognition result according to a zoom change according to an embodiment of the present invention.

Referring to FIG. 9A, a user selects an object displayed within a preview image frame having 604*480 resolution, e.g., a movie poster, as a Region Of Interest (ROI).

Referring to FIG. 9B, the region of interest is automatically cropped from a raw image frame having full resolution larger than 640*480 resolution.

Referring to FIG. 9C, the cropped region of interest is magnified and displayed (zoomed-in), and an object recognition for the magnified, displayed region of interest is performed.

Referring to FIG. 8, the zoom control process enables a recognition to be possible, even when an object visible in a preview image frame is small, because the zoom control process obtains a region of interest from a raw image frame having full resolution.

In step S410, the zoom control determiner 154 determines whether there is a user input related to the performance of the zoom control process through the input unit 160.

When there is the user input, in step S420, the zoom control determiner 154 determines whether a crop status corresponds to "1". As illustrated in the table located in a left upper portion of FIG. 8, the crop status is set to "0" in an initial status or in a zoom setting start status, set to "1" in a status during a zoom setting, and set to "2" in a zoom status or in a zoom cancel start status. The input status is set to "1" in a zoom setting start status or in a zoom cancel start status, and set to "0" in the remaining statuses.

When the crop status does not correspond to "1", the crop status is set to "1" in step S430.

In step S440, the zoom control determiner 154 determines values of the crop status and the input status.

Step S450 is performed when the crop status and the input status correspond to (0, 1), step S470 is performed when the crop status and the input status correspond to (1, 0), and step S510 is performed when the crop status and the input status correspond to (2, 1).

In step S450, the zoom control determiner 154 sets the crop status and the input status to (1, 0), and in step S460, the zoom control determiner 154 calculates a coordinate and a size of the region of interest when the preview image frame is changed to a full image frame (i.e. a raw image frame). For example, the coordinates of the region of interest may be obtained by a user input on a touch screen, and the size of the region of interest may be calculated by (full resolution/preview resolution*(ROI size+margin)). The zoom control determiner 154 then transmits the calculated coordinate and size of the region of interest to the imaging controller 170.

In step S470, the zoom control determiner 154 determines a capability of the recognition result received from the image recognition processor 120, i.e., whether the recognition result is satisfactory or dissatisfactory. As described above, the zoom control determiner 154 determines the capability of the recognition result based on feature information identified through the recognition result.

When the recognition result is satisfactory, the zoom control determiner 154 sets the crop status to "2" in step S480. However, when the recognition result is not satisfactory, the zoom control determiner 154 stores the number of recognition dissatisfaction during the zoom control process in step S490. In step S500, the zoom control determiner 154 compares the number of accumulated recognition dissatisfactions with a preset threshold value.

When the number of accumulated recognition dissatisfaction is larger than the preset threshold value, the zoom control determiner 154 sets the crop status and the input status to (0, 0) in step S510, and sets the imaging controller 170 such that the full image frame is returned to the preview image frame in step S520. Thereafter, the zoom control determiner 154 transmits the calculated coordinate and size of the region of interest to the imaging controller 170.

Although FIG. 8 illustrates that the zoom control process is terminated when the number of accumulated dissatisfaction is smaller than or equal to the preset threshold value, alternatively, the zoom control process may return to step S410 until the recognition result received from the image recognition processor 120 is satisfactory or the number of accumulated recognition dissatisfaction is larger than the preset threshold value.

Alternatively, determining the object recognition capability may be added before step S410, and the zoom control process may be automatically performed when the recognition result fails. In the automatic performance, the zoom control determiner 154 can perform instructions (indicating an instruction message for a region of interest selection and indicating a selection standby of plural regions of interest) related to the performance of the zoom control process.

Figure 10:
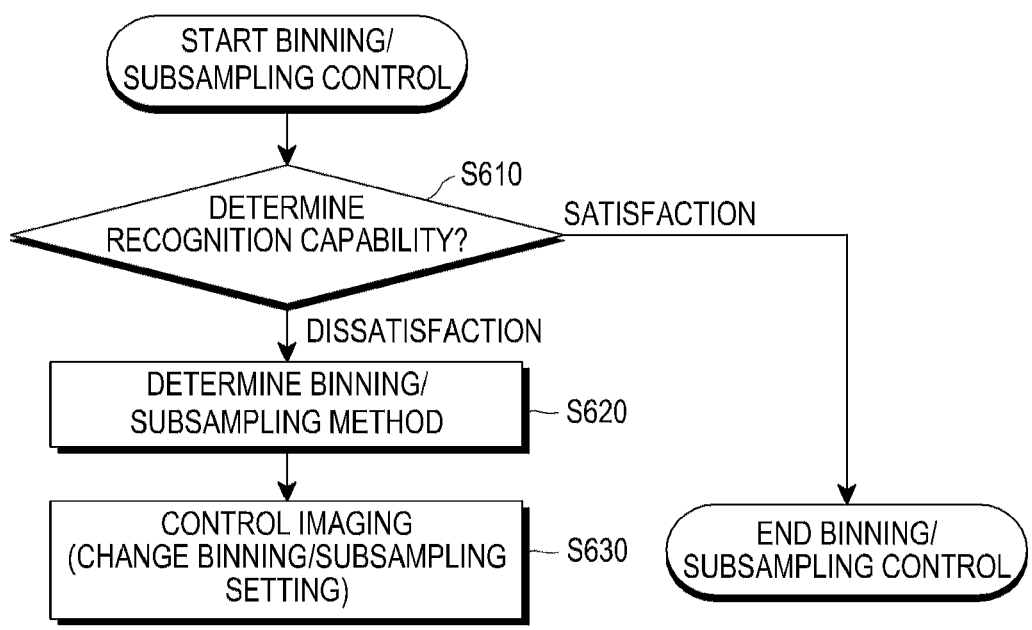
FIG. 10 is a flowchart illustrating a binning/subsampling control process according to an embodiment of the present invention.

FIG. 10 is a flowchart illustrating a binning/subsampling control process according to an embodiment of the present invention. Specifically, in FIG. 10, when a full image is resized to a preview image, the binning/subsampling control process sets the setting values of binning and subsampling to be different from each other, which strengthens edge information and improves a recognition capability.

Referring to FIG. 10, the binning/subsampling control determiner 156 determines a capability of the recognition result received from the image recognition processor 120, i.e., whether the recognition result is satisfactory or dissatisfactory. As described above, the binning/subsampling control determiner 156 determines the capability of the recognition result based on feature information identified through the recognition result, or can directly receive information on whether or not the recognition is satisfactory from the image recognition processor 120.

The binning/subsampling control process is terminated when the recognition result is satisfactory. However, when the recognition result is dissatisfactory, i.e., feature information included in the image recognition result is not satisfied with preset threshold conditions, the binning/subsampling control determiner 156 determines the binning/subsampling method in step S620. For example, a process of the binning/subsampling control determiner 156 determines the binning/subsampling method includes the following sub-steps of:

1. Securing a brightness through a binning method, such as average binning, summing binning, and skipping, to change a size of a raw image in order to more easily extract an edge.

2. Applying a subsampling method, such as nearest neighbor, bicubic, and bilinear, to the image having changed size, in order to more easily extract edge information according to a recognition capability result in performing a scaling down the image, of which size has been changed, to an image having an actual preview size.

3. Determining optimal methods among the binning and subsampling methods to be selected.

The binning/subsampling control determiner 156 can determine the binning and subsampling method based on the recognition result. Specifically, the binning/subsampling control determiner 156 may refer to a table, and select a binning and subsampling method corresponding to at least one of the number of feature points, an edge intensity, and the number of matched feature points grasped from the recognition result from the table. The table may be stored in the memory 130.

In step S630, the binning/subsampling control determiner 156 transmits the selected binning and subsampling method to the camera setting parameter determiner 158, and the camera setting parameter determiner 158 transmits the received binning and subsampling method to the imaging controller 170.

Although FIG. 10 illustrates that the binning/subsampling control process is terminated after step S630, steps S610 to S630 may be repeated until the recognition result received from the image recognition processor 120 is satisfactory. In this case, a preset priority or random selection of different binning and subsampling methods at each of repetitive steps may be selected.

Figure 11:
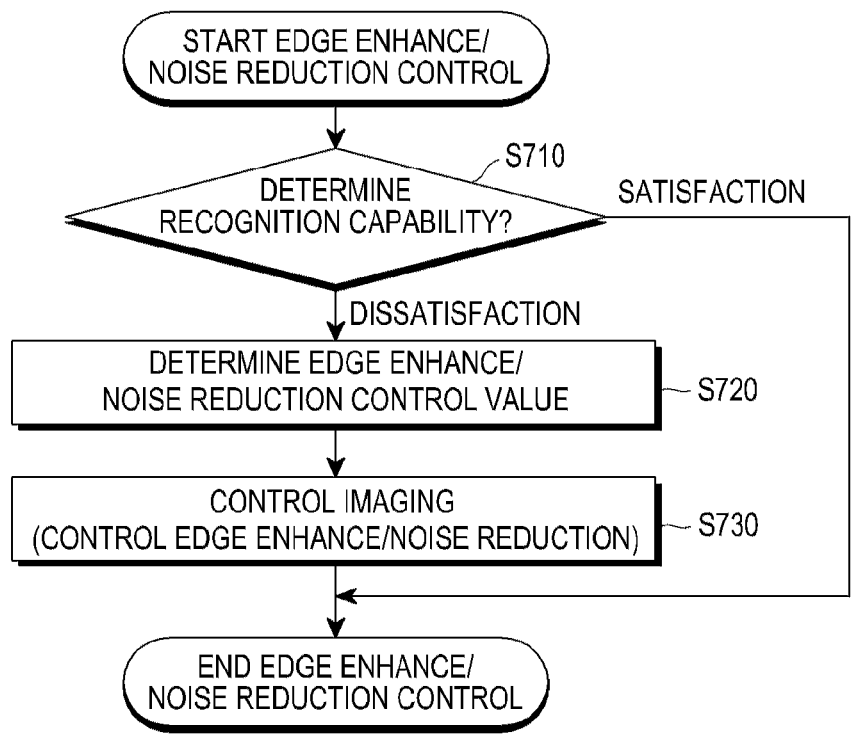
FIG. 11 is a flowchart illustrating an edge enhance/noise reduction control process according to an embodiment of the present invention.

FIG. 11 is a flowchart illustrating an edge enhance/noise reduction control process according to an embodiment of the present invention. Specifically, the edge enhance/noise reduction control process in FIG. 11 analyzes a capability recognizing an object within a preview image to increase an edge enhance/noise reduction control value until the edge enhance/noise reduction control value reaches a desired reference, which improves a capability of a recognition algorithm.

Referring to FIG. 11, the enhance/noise reduction control determiner 157 determines a capability of the recognition result received from the image recognition processor 120, i.e., whether the recognition result is satisfactory or dissatisfactory, in step S710. As described above, the enhance/noise reduction control determiner 157 determines the capability of the recognition result based on feature information identified through the recognition result, or can directly receive information on whether the recognition from the image recognition processor 120 is satisfactory.

The edge enhance/noise reduction control process is terminated when the recognition result is satisfactory. However, when the recognition result is dissatisfactory, i.e., feature information included in the image recognition result is not satisfied with preset threshold conditions, the edge enhance/noise reduction control determiner 157 determines the edge enhance/noise reduction control value based on the recognition result in step S720. For example, the edge enhance/noise reduction control determiner 157 may refer to a table, and select an edge enhance/noise reduction control value corresponding to at least one of the number of feature points, an edge intensity, and the number of matched feature points grasped from the recognition result from the table.

Figure 12:
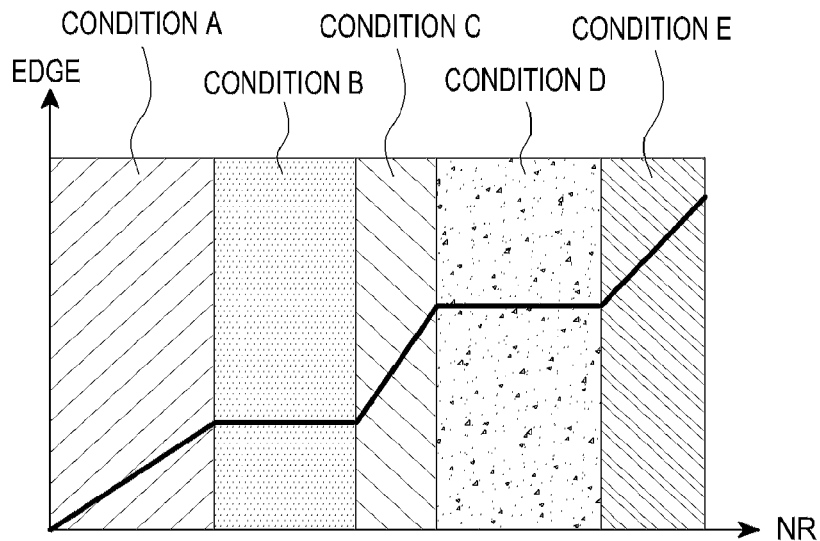
FIG. 12 is a graph illustrating a table used in an edge enhance/noise reduction control process according to an embodiment of the present invention.

FIG. 12 is a graph illustrating a table used in an edge enhance/noise reduction control process according to an embodiment of the present invention.

Referring to FIG. 12, at least one of the number of feature points, the edge intensity, and the number of matched feature points identified from the recognition result is classified by various conditions (conditions A to E), and there is a range of an edge enhance/noise reduction control value corresponding to the condition.

In step S730, the edge enhance/noise reduction control determiner 157 transmits the determined edge enhance/noise reduction control value to the camera setting parameter determiner 158, which transmits the received edge enhance/noise reduction control value to the imaging controller 170.

Although FIG. 11 illustrates that the edge enhance/noise reduction control process is terminated after step S730, steps S710 to S730 may be repeated until the recognition result received from the image recognition processor 120 is satisfactory. In this case, an edge enhance/noise reduction control value at each of repetitive steps may be increased by a certain amount from the current edge enhance/noise reduction control value.

Additionally, the above-described embodiments of the present invention can be implemented by hardware and a combination of the hardware and software. For example, the certain software can be stored, regardless of possibility of omission or rewrite, in volatile or non-volatile storage devices such as Read Only Memories (ROMs), memories such as Random Access Memories (RAMs), memory chips, devices or integrated circuits, and optically or magnetically recordable and machine-readable storage media such as a Compact Disc (CD), a Digital Versatile Disc (DVD), a magnetic disk, a magnetic tape, etc. A storage unit, which can be included in the host device, can store a program including instructions for implementation of the embodiments of the present invention or the machine-readable storage media suitable for storing the programs.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of recognizing an object by a camera, the method comprising:
    capturing a first preview image;
    detecting feature information from the first preview image;
    comparing the feature information with a threshold condition;
    when the feature information does not satisfy the threshold condition, selecting a camera setting parameter from a plurality of camera setting parameters based on a preset selection order of the plurality of camera setting parameters, changing the selected camera setting parameter, capturing a next preview image in accordance with the changed camera setting parameter, detecting next feature information from the next preview image generated based on the changed camera setting parameter, comparing the next feature information with the threshold condition, performing object recognition for the next preview image when the next feature information satisfies the threshold condition, and repeating the selecting, changing, capturing, detecting, and comparing steps, when the next feature information does not satisfy the threshold condition,
    wherein, when the selected camera setting parameter relates to zoom control, changing the selected camera setting parameter comprises:
        selecting a region of interest from an image frame; and
        cropping the region of interest in the image frame,
            wherein the object recognition is performed for the cropped region of interest.

2. The method of claim 1, wherein the feature information includes at least one of a number of matched feature points, an edge intensity, and an amount of textures.

3. The method of claim 2, wherein the matched feature points are feature points, among detected feature points of the first preview image, which correspond to feature points of a pre-stored reference image.

4. The method of claim 1, wherein, when the selected camera setting parameter relates to ISO control, changing the selected camera setting parameter comprises:
    determining an ISO control value based on the feature information; and
    controlling a gain of an image sensor installed in the camera according to the ISO control value.

5. The method of claim 1, wherein, when the selected camera setting parameter relates to auto focus control, changing the selected camera setting parameter comprises:
    calculating a motion vector of an object in an image frame;
    determining a movement direction of the object; and
    performing an auto focus process, when the movement direction of the object is in a longitudinal direction.

6. The method of claim 1, wherein, when the selected camera setting parameter relates to exposure control, changing the selected camera setting parameter comprises:
    calculating a motion vector of an object in an image frame;
    determining a brightness of the image frame, when there is a movement of the object; and
    controlling a frame rate, when the brightness of the image frame is greater than a threshold value.

7. The method of claim 1, further comprising displaying the first preview image in a display, based on a preset camera setting parameter.

8. A camera apparatus for recognizing an object, the camera apparatus comprising:
    an imaging unit configured to capture preview images;
    an imaging controller configured to change camera setting parameters;
    an image recognition processor configured to detect feature information and perform object recognition; and
    a camera setting parameter controller configured to control the imaging unit to capture a first preview image, control the image recognition processor to detect feature information from the first preview image, compare the feature information with a threshold condition, and when the feature information does not satisfy the threshold condition, select a camera setting parameter from a plurality of camera setting parameters based on a preset selection order of the plurality of camera setting parameters, control the imaging controller to change the selected camera setting parameter, control the imaging unit to capture a next preview image in accordance with the changed camera setting parameter, control the image recognition processor to detect next feature information from the next preview image generated based on the changed camera setting parameter, compare the next feature information with the threshold condition, control the image recognition processor to perform object recognition for the next preview image when the next feature information satisfies the threshold condition, and repeat the select, control the image controller to change, control the imaging unit to capture, control the image recognition processor to detect, and compare operations, when the next feature information does not satisfy the threshold condition,
    wherein, when the selected camera setting parameter relates to zoom control, the camera setting parameter controller comprises a zoom control determiner configured to select a region of interest from an image frame and crop the region of interest in the image frame, and
    wherein the image recognition processor is configured to perform the object recognition for the cropped region of interest.

9. The camera apparatus of claim 8, wherein the feature information comprises at least one of:
    a number of matched feature points;
    an edge intensity; and
    an amount of textures.

10. The camera apparatus of claim 9, wherein the matched feature points are feature points, among detected feature points of the first preview image, which correspond to feature points of a pre-stored reference image.

11. The camera apparatus of claim 8, wherein, when the selected camera setting parameter relates to ISO control, the camera setting parameter controller comprises:
    an ISO control determiner configured to determine an ISO control value based on the feature information, wherein the imaging controller is further configured to control a gain of an image sensor installed in the camera apparatus, based on the ISO control value.

12. The camera apparatus of claim 8, wherein, when the selected camera setting parameter relates to auto focus control, the camera setting parameter controller comprises an auto focus control determiner configured to calculate a motion vector of an object in an image frame, determine a movement direction of the object, and activate an auto focus procedure when the movement direction of the object is in a longitudinal direction.

13. The camera apparatus of claim 8, wherein, when the selected camera setting parameter relates to exposure control, the camera setting parameter controller comprises an exposure control determiner configured to calculate a motion vector of an object in an image frame, determine a brightness of the image frame, and determine a control value of a frame rate, when the brightness of the image frame is greater than a threshold value.

14. The camera apparatus of claim 8, further comprising:
   an imaging unit configured to generate the first preview image based on a preset camera setting parameter and generate a second preview image based on the changed camera setting parameter; and
   a display unit configured to display the first preview image and the second preview image.

15. An article of manufacture for recognizing an object by a camera, comprising a non-transitory machine readable medium containing one or more programs which when executed implement the steps of:
   capturing a first preview image;
   detecting feature information from the first preview image;
   comparing the first feature information with a threshold condition;
   when the first feature information does not satisfy the threshold condition, selecting a camera setting parameter from a plurality of camera setting parameters based on a preset selection order of the plurality of camera setting parameters, changing the selected camera setting parameter, detecting next feature information from a next preview image generated based on the changed camera setting parameter, capturing a next preview image in accordance with the changed camera setting parameter, detecting next feature information from the next preview image generated based on the changed camera setting parameter, comparing the next feature information with the threshold condition, performing object recognition for the next preview image when the next feature information satisfies the threshold condition, and repeating the selecting, changing, capturing, detecting, and comparing steps, when the next feature information does not satisfy the threshold condition,
   wherein, when the selected camera setting parameter relates to zoom control, changing the selected camera setting parameter comprises:
   selecting a region of interest from an image frame;
   and cropping the region of interest in the image frame,
   wherein the object recognition is performed for the cropped region of interest.

\* \* \* \* \*